United States Patent Office 3,479,148
Patented Nov. 18, 1969

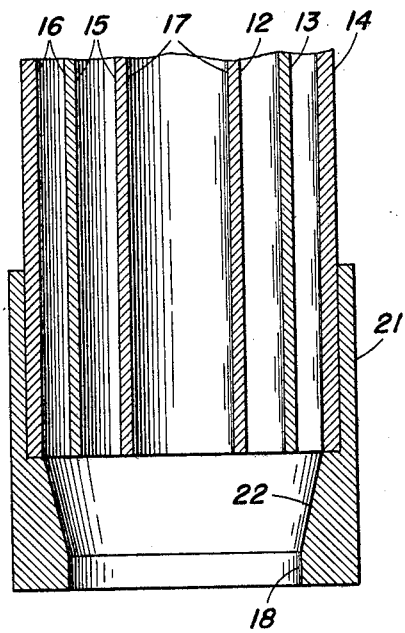
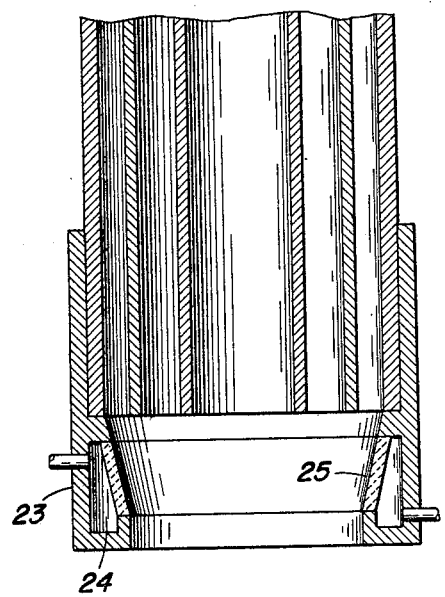
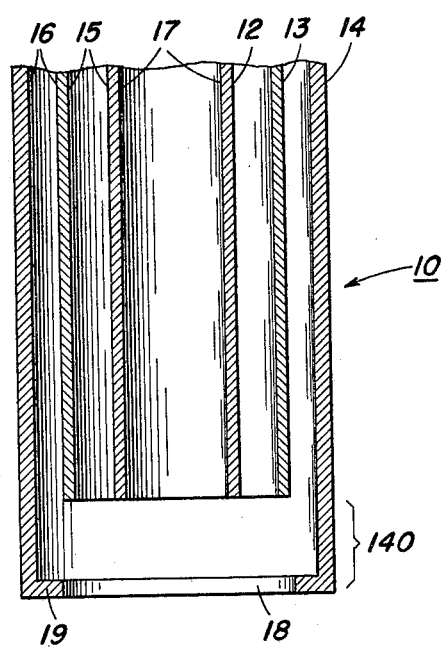
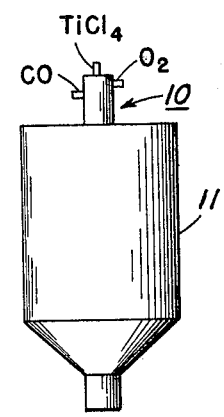

3,479,148
MANUFACTURE OF FINE PARTICLE SIZE TITANIUM DIOXIDE
Peter Tillmann, deceased, late of Leverkusen, Germany, by Margarete Tillmann, sole heir, Cologne-Deutz, Germany, and Achim Kulling and Gerhard Hitzemann, Leverkusen, Germany, assignors to Titangesellschaft m.b.H., Leverkusen, Germany, a corporation of Germany
Original application Apr. 10, 1964, Ser. No. 358,961, now Patent No. 3,355,253, dated Nov. 28, 1967. Divided and this application June 23, 1966, Ser. No. 571,354
Claims priority, application Germany, Apr. 13, 1963, T 23,838
Int. Cl. C01g 23/04
U.S. Cl. 23—202                               1 Claim

ABSTRACT OF THE DISCLOSURE

The disclosure is of a novel multi-tube burner for use in the vapor phase production of $TiO_2$ pigmentary material; and to a method of operating the burner wherein the directions of flow of three separate concentric gas streams i.e. $TiCl_4$, $O_2$ and CO issuing from the burner at velocities within a predetermined range are modified at a distance within a predetermined range from the end of the burner to form a single gas stream the cross-sectional area of which is at most 0.85 the free cross-sectional area of the burner.

---

The present application is a division of parent application Ser. No. 358,961 filed Apr. 10, 1964 which matured into U.S. Patent 3,355,253, Nov. 28, 1967.

In the manufacture of titanium dioxide pigments by combustion of gaseous titanium tetrachloride with oxygen or gases containing oxygen in a reaction chamber in the presence of an auxiliary flame for maintaining combustion, wherein a burner is used consisting of several co-axially arranged tubes, the tinting strength and rutile content of the product thus obtained are unsatisfactory unless special measures are taken.

It has been suggested, earlier, that the rutile content and the tinting strength of the pigment will be optimum when the thickness of the gas stream, in the combustion of a mixture of titanium tetrachloride and oxygen, is no greater than 10 mm. This means, however, that in large scale production the titanium tetrachloride-containing gas stream would have to be subdivided into a plurality of streams none of which are greater than 10 mm. in thickness, thus necessitating complicated burner types attended by construction and operational difficulties to a very high degree. Furthermore, attempts have been made to reach this goal by imparting a spiral movement to at least one of the reaction components but this technique also necessitates a complicated burner construction. It is also possible to produce titanium dioxide pigment of high tinting strength by using a considerable excess of oxygen but this procedure is costly and entails disadvantages in the reuse of the reuse of the combustion gases for chlorination.

In addition to the disadvantages enumerated above all of the prior art burners have a common weakness in that in continuous operation hard deposits of titanium dioxide are formed on the burner which initially disturb the flow characteristics of the flame and thus lead to impairment of pigment quality; and eventually actually close-off the burner orifices to such an extent that combustion of the gases is terminated.

These deposits of titanium dioxide are of two types and may be differentiated on the basis of their origin; first, freshly formed titanium dioxide which is distributed throughout the entire reaction chamber by the turbulent gas flow and which is deposited on all walls as well as on the burner tube. A certain solidification of this titanium dioxide deposit, which is at first rather loose, will take place due to the heat of the flame jet. The solidified deposits of titanium dioxide may take the form of long spikes that extend partly into the flame; or may take the form of a tube-like envelope surrounding the flame. Moreover if these spike-like deposits extend into the decomposition zone of the titanium tetrachloride and oxygen, then their subsequent growth takes place directly out of the flame and this produces particularly hard deposits. Secondly, titanium dioxide deposits which form on the burner mouth caused by back turbulence of hot gas fractions within the reaction chamber with consequent narrowing of the burner openings.

An object therefore of the present invention is to provide an improved method and means for producing high quality titanium dioxide pigmentary material, by a vapor phase reaction of titanium tetrachloride and oxygen, economically and on a commercial scale for relatively long periods of operation.

A further object of the invention is to provide an improved multi-tube burner for the production of fine particle size titanium dioxide by combustion of gaseous titanium tetrachloride with oxygen or gases containing oxygen in a reaction chamber in the presence of an auxiliary flame for maintaining combustion wherein said burner is not limited to a gas stream of prescribed thickness, is of simple and inexpensive construction and can be operated continuously without becoming plugged by deposits of titanium dioxide or other causes of malfunction.

Other objects, features and advantages of the invention will be revealed in the description of the invention which follows in which:

FIG. 1 is a diagrammatic view of a burner-reactor assembly;

FIG. 2 is a diagrammatic showing, in vertical longitudinal section, of one form of the improved multi-tube burner of this invention;

FIG. 3 is a diagrammatic showing, in vertical longitudinal section of a modification of the burner construction shown in FIG. 2; and FIG. 4 is a fragmentary view, in vertical longitudinal section, showing a modification of the burner cap of FIG. 3.

Referring to the drawings, the improved multi-tube burner of this invention is identified generally by the numeral 10 and is adapted to be mounted on the upper end of the reaction chamber 11 as shown in FIG. 1, for producing titanium dioxide by a vapor phase reaction of titanium tetrachloride and oxygen. The burner 10 comprises three axially arranged tubes 12, 13 and 14 respectively, each of a different overall diameter and in the present embodiment arranged substantially concentrically with respect to each other. For purposes of identification tube 12 will be hereafter referred to as the inner tube, tube 13 as the intermediate tube and tube 14 as the outer tube. Each tube is made of a suitable material to withstand relatively high temperatures and to this end may be made of a heat resistant steel, a nickel alloy or possibly silica or other suitable ceramic materials. The diameters of the respective tubes are also selected so as to provide an annular gas passage 15 between the inner tube 12 and the intermediate tube 13; and an annular gas passage 16 between the intermediate tube 13 and the outer tube 14. The bore 17 of the inner tube 12 constitutes a third gas passage. The upper ends (not shown) of the tubes 12, 13 and 14 of the burner 10 are adapted to be connected to suitable gas sources, hereafter described, which feed the respective gases through the gas passages in separate streams.

Referring again to FIG. 2, the open ends of the inner tube 12, and the intermediate tube 13 are substantially flush whereas the corresponding end of the outer tube 14 is extended beyond the open ends of the tubes 12 and 13. It has been discovered that the extension of the open end of the outer tube 14 beyond the open ends of the tubes 12 and 13 is a vital factor in the effective operation of the burner. If this extension, which is indicated at 140, is too short the burner flame will flicker and will be easily extinguished whereas if the extension is too long the reaction between the gases will be initiated before the gases have passed through the extension of the outer tube 14. As a consequence titanium dioxide deposits will be formed on the burner tubes and quickly plug up the burner. The length of the extension 140 depends in general upon the capacity of the burner and in this respect may vary for 5 to 100 mm. depending on gas flow rates, the size of burner tubes and similar factors.

The extremity of the extension 140 is provided with a restricted aperture 18 which serves to modify the flow of gases issuing from the gas passages of the burner. More particularly it has been found that the cross-sectional area of the aperture 18 should not exceed the free cross-sectional area of the burner. The phrase "free cross-sectional area of the burner" will be understood to mean the sum of the cross sectional areas of the gas passages 15, 16 and 17.

In general the optimum size of the aperture 18 will depend upon the throughput of titanium tetrachloride. A larger thruput requires a larger aperture and a lesser thruput requires a smaller aperture for a given burner. The minimum size of the aperture 18 is determined by such considerations as the particle size of the titanium dioxide produced and the operation of the burner. In general the particle size of the titanium dioxide decreases as the size of the aperture 13 is decreased. Moreover, if the aperture 18 is too small the flame will be unstable and readily extinguished. It is not surprising therefore that by calibrating the size of the restricted aperture 18 of the extension 140 a standardization of the tinting strength of the pigment is possible. In this connection high tinting strengths are assured provided the cross-sectional area of the restricted aperture 18 does not exceed about 0.85 of the free cross-sectional area of the burner.

Thus while the length of the extension 140 of the outer tube 14 is an important factor in the operation of the burner continuously and without plugging over extended periods of time, the quality of the pigment produced depends, in the main, upon the cross sectional area of the restricted aperture 18 in the extension 140 as related to the free cross sectional area of the burner.

In the burner shown in FIG. 2 the extension 140 is shown as an integral part of the outer tube 140 and is provided with an annular inwardly projecting lip 19 which is in a plane substantially at right angles to the wall of the tube 14 and defines the restricted aperture 18.

The invention is not limited however to this construction and FIG. 3 shows a modification wherein the functions of the extension 140 are incorporated in a cap-like member 21 which may be constructed as an integral part of the outer tube 14 but is preferably designed as a removable cap. Thus by providing a plurality of cap-like members 21 of different dimensions, i.e. having different lengths and aperture openings, the capacity of a given burner and/or the quality of the pigment produced may be varied by simply substituting different caps.

Although the cap 21 is shown with a sloping inner wall 22 which blends into the annular wall of the restricted aperture 18 the particular shape of the inner wall of the cap i.e. whether sloping or at right angles to the plane of the aperture 18 is not significant and either construction will serve to modify the flow of gases issuing from the gas passages of the burner. It is also within the purview of the instant invention to design the cap 21 with a double wall 23 (see FIG. 4) so as to form an annular duct 24 within said cap with means connected thereto for circulating air, water or other coolants through the cap duct thereby reducing the effect of heat radiation at the apertured end or mouth of the cap. In this connection the invention also contemplates a double-walled cap having a duct 24 the inner wall 25 of which is formed of a porous material i.e. gas permeable metal or ceramic material such that an inert gas may be bled through the pores of the inner wall of the cap to prevent the formation and/or accumulation of loose deposits of titanium dioxide thereon.

As mentioned above whereas the burners of the prior art which use a mixture of gaseous titanium tetrachloride and oxygen have been limited to a gas stream no greater than 10 mm. thick the burner of this invention has no such limitation and hence is adaptable to large scale production. In this connection the gaseous titanium tetrachloride is fed into the inner tube 12 of the burner 10 preferably without admixture with oxygen and in lieu thereof additions of other gases as for example silicon tetrachloride and/or aluminum trichloride may be added for effecting improvement in pigment quality. Some of the oxygen required for combustion may be admixed with the gaseous titanium tetrachloride if desired but the bulk of the oxygen required for conversion of the titanium tetrachloride to titanium dioxide is fed into the annular gas passage 15. Carbon monoxide is most commonly employed as the combustible gas for maintaining the auxiliary flame in the reaction chamber, and is fed into the annular gas passage 16 of the burner. It will be understood that other gases such as hydrogen, hydrogen containing gases, hydrocarbons or mixtures of these gases may be used also in lieu of carbon monoxide for supporting the auxiliary flame.

As will be seen from the drawings the burner according to this invention is of relatively simple and economical construction and although the respective feed tubes 12, 13 and 14 are shown in substantially concentric relationship an exact concentricity is not mandatory; nor is it necessary to obtain equalization of the circumferential gas velocities of the oxygen and carbon monoxide.

In operation, the flame produced by the burner 10 is formed down in the reaction chamber 11 at a distance below the mouth of the burner such that the heat sensitive edges of the burner tubes are not overheated. Consequently the burner may be operated for extended periods of time without the edges of the burner tubes being corroded or otherwise attacked. The titanium dioxide is produced in the flame below the mouth of the burner and hence only inconsequential amounts of titanium dioxide contact the edges of the burner tubes. Such as does it usually on the edges of the outer tube (or cap) of the burner where the deposit causes no particular trouble and, in fact, automatically drops off after some growth; or may be readily removed by periodically rapping the end of the burner or lightly scraping off the deposit. Moreover deposits of titanium dioxide, such as are formed on the burners of the prior art by back turbulence of hot gas fractions do not occur in the burner of this invention due to the fact that the extension of the outer tube (or cap) of the burner causes the gases to react in a zone removed from the ends of the burner tubes and in particular the inner tube 12 of the burner. At the same time the effect of chlorine gas and excessive heat on the edges of the burner is minimized thus reducing corrosion of these parts of the burner.

Thus the improved burner of this invention guarantees dependable and safe operation and the production of pigment of excellent tinting strength and high rutile content even with throughputs of gaseous titanium tetrachloride of 500 kg. per hour, and above. Further it is not necessary to use a considerable excess of oxygen, nor to limit the thickness of the titanium tetrachloride gas stream or resort to a complex and expensive burner design for effecting spiral movement of the titanium tetrachloride gas stream.

The examples which follow will further illustrate the novelty and superior operation of the burner of this invention. In these examples the tinting strength of the pigments obtained were determined according to the following standardized test method.

TINTING STRENGTH TEST

The pigment to be tested was made into a paste with a mixture of carbon black, calcium carbonate and linseed oil; and was then compared visually with a standard paste. The standard paste was prepared with a definite amount of a standard pigment. The amount of the pigment used in the test paste was varied until the brightness of this test paste equaled that of the standard paste. The tinting strength was calculated from the amount of the pigment required for equality of brightness of the two pastes. The higher the tinting strength, the better the pigment, a good pigment being one having at least a value of 1650 by this test.

In the following examples the titanium tetrachloride was in each instance, preheated to 350° C. and the oxygen to 250° C. The carbon monoxide was used at ambient temperature.

The duration of each experiment was about 8 hours, with the exception of Examples 5 and 7. After this operational period, the burners were still in excellent shape so that combustion could have been continued without ill effects.

Examples 1–4

In each of Examples 1 thru 4 the same burner was used. The burner consisted of three coaxially arranged cylindrical tubes, such as shown in FIG. 2 having the following dimensions:

|  | Inner tube (mm.) | Intermediate tube (mm.) | Outer tube (mm.) |
| --- | --- | --- | --- |
| O.D. | 30 | 45 | 57 |
| Wall thickness | 3 | 2.5 | 2.5 |

The outer tube was adapted to have a removable cap. The distance between the cap aperture 18 and the end of the inner tube 12 of the burner was maintained constant at 20 mm. for each of the four examples. Variations in flow rates $TiCl_4$, $O_2$ and CO were made, as well as the use of caps having apertures 18 of different diameters.

A summation of data obtained from these four experimental runs is recorded in Table I. It was found that an increase in thruput of titanium tetrachloride above 50 kg./hr. (Example 1) or above 75 kg./hr. (Example 2) was not possible since the high gas velocity caused the flame to break off. As indicated by the unsatisfactory tinting strength data for the pigment of Example 4 the cap opening was too large. Example 3 was repeated several times for confirmation, as shown in Examples 6 and 9, and each time the data was identical.

Examples 5–7

In Examples 5–7 the same burner was employed as in Examples 1–4 and the diameter of the cap aperture was 32 mm. the only variations made were in the distances between the cap aperture 18 and the end of the inner tube 12 of the burner.

The experimental data for runs 5–7 are recorded in Table I. It was found that when this distance was reduced below 5 mm., the flame broke off and that a considerable amount of titanium dioxide was deposited on the outside tube of the burner. Moreover in Example 7 such an amount of titanium dioxide deposited on the inside of the cap that the experiment had to be discontinued after an operating period of two hours.

Examples 8–10

In Examples 8–10 the same burner was used as in the preceding examples. In these runs (Examples 9–10) the titanium tetrachloride thruput was increased; and the size of the cap aperture 18 and its distance from the end of the inner tube 12 was also varied. The results of these experimental runs are shown in Table I.

Examples 11 and 12

In Examples 11 and 12, a burner of the type shown in FIG. 3 was employed, the dimensions of the burner being as follows:

|  | Inner tube (mm.) | Intermediate tube (mm.) | Outer tube (mm.) |
| --- | --- | --- | --- |
| O.D. | 18 | 30 | 45 |
| Wall thickness | 2 | 2 | 2.5 |
| O.D. | 45 | 76 | 95 |
| Wall thickness | 2.5 | 3 | 3.5 |

The experimental data obtained from these runs is recorded in Table I.

TABLE I

| Example No. | 1 | 2 | 3 | 4 |
| --- | --- | --- | --- | --- |
| Distance between cap aperture and end of inner tube (mm.) | 20 | 20 | 20 | 20 |
| Diameter of cap aperture (mm.) | 20 | 25 | 32 | 40 |
| Ratio of cross-section of cap aperture and free cross sectional area of burner | 0.205 | 0.32 | 0.525 | 0.822 |
| $TiCl_4$ kg./hr. in inner tube | 50 | 50 | 100 | 100 |
| $O_2$ (std. cu.m./hr.) in intermediate tube | 11 | 14 | 20 | 20 |
| Co. (std. cu.m./hr.) in outer tube | 9.5 | 15 | 15 | 15 |
| Oxygen excess, percent | 3 | 4 | 4 | 4 |
| Rutile content, percent | 85 | 85 | 90 | 80 |
| Tinting strength | 1,775 | 1,700 | 1,700 | 1,525 |

| Example No. | 5 | 6 | 7 | 8 |
| --- | --- | --- | --- | --- |
| Distance between cap aperture and end of inner tube (mm.) | 5 | 20 | 42 | 15 |
| Diameter of cap aperture (mm.) | 32 | 32 | 32 | 25 |
| Ratio of cross-section of cap aperture and free cross sectional area of burner | 0.525 | 0.525 | 0.525 | 0.32 |
| $TiCl_4$ kg./hr. in inner tube | 100 | 100 | 100 | 50 |
| $O_2$ (std. cu.m./hr.) in intermediate tube | 20 | 30 | 20 | 14 |
| CO (std. cu.m./hr.) outer tube | 15 | 15 | 15 | 15 |
| Oxygen excess, percent | 4 | 4 | 4 | 4 |
| Rutile content, percent | 85 | 90 | 85 | 85 |
| Tinting strength | 1,600 | 1,700 | 1,425 | 1,700 |

| Example No. | 9 | 10 | 11 | 12 |
| --- | --- | --- | --- | --- |
| Distance between cap aperture and end of inner tube (mm.) | 20 | 25 | 5 | 30 |
| Diameter of cap aperture (mm.) | 32 | 40 | 19 | 51.5 |
| Ratio of cross-section of cap aperture and free cross sectional area of burner | 0.525 | 0.822 | 0.29 | 0.41 |
| $TiCl_4$ kg./hr. in inner tube | 100 | 300 | 25 | 450 |
| $O_2$ (std.cu.m./hr.) in intermediate tube | 20 | 52 | 5.4 | 72 |
| CO (std. cu.m./hr.) outer tube | 15 | 30 | 4.5 | 35 |
| Oxygen excess, percent | 4 | 3 | 4 | 3 |
| Rutile content, percent | 90 | 95 | 85 | 85 |
| Tinting strength | 1,700 | 1,700 | 1,675 | 1,675 |

While the foregoing description and examples illustrate multi-tubular burners comprising three concentrically arranged tubes it will be appreciated that the invention also contemplates burner modifications wherein more than three tubes are used as for example additional concentrically arranged tubes for feeding oxygen and/or CO to the burner flame; and the use of burner tubes which are non-circular in cross section as for example rectilinear or eliptical tubes.

The invention may be carried out in other specific ways than those herein set forth without departing from the spirit and essential characteristics of the invention, and the present embodiments are, therefore, to be considered in all respects as illustrative and not restrictive and all changes coming within the meaning and equivalency range of the appended claims are intended to be embraced therein.

It is claimed:

1. Process for producing pigmentary titanium dioxide by vapor phase reaction of gaseous $TiCl_4$ and oxygen in the presence of an auxiliary flame comprising: feeding separate streams of gaseous $TiCl_4$, oxygen and a combustible gas through the separate concentric gas passages respectively of a multi-tube burner, the feed rate of said $TiCl_4$ being from 25–450 kg./hr., said $O_2$ from 5.4–73 cu. m./hr. and said combustible gas from 4.5–35 cu. m./hr., modifying the flow pattern of the concentric gas streams issuing from the open ends of the respective gas passages of said multi-tube burner by restricting the cross sectional area of the flow pattern of said concentric gas streams to from 0.29 to 0.41 the sum of the cross sectional areas of the three concentric gas passages of the multi-tube burner, the restriction of the flow pattern of said concentric gas streams being effected at a distance from 5 mm. to 30 mm. from the open ends of said gas passages, and effecting the reaction of said gaseous TiCl$_4$ and oxygen, in the presence of an auxiliary flame produced by said combustible gas in a reaction zone at said restricted opening.

References Cited

UNITED STATES PATENTS

| | | | |
|---|---|---|---|
| 2,779,662 | 1/1957 | Frey | 23—202 |
| 2,823,982 | 2/1958 | Saladin et al. | 23—202 |
| 2,957,753 | 10/1960 | Nelson et al. | 23—202 |
| 3,068,113 | 12/1962 | Strain et al. | 23—202 XR |
| 3,069,281 | 12/1962 | Wilson | 23—202 XR |
| 3,105,742 | 10/1963 | Allen et al. | 23—202 |
| 3,109,708 | 11/1963 | Walmsley | 23—202 |
| 3,120,427 | 2/1964 | Mas et al. | 23—202 |
| 3,214,284 | 10/1965 | Wilson | 23—202 XR |
| 3,355,253 | 11/1967 | Tillman et al. | 23—202 XR |

EDWARD STERN, Primary Examiner

U.S. Cl. X.R.

106—300